United States Patent [19]

Walker

[11] Patent Number: 5,599,855
[45] Date of Patent: Feb. 4, 1997

[54] SELF-EMULSIFYING EPOXY CURING AGENT

[75] Inventor: Frederick H. Walker, Doylestown, Pa.

[73] Assignee: Air Products and Chemicals, Inc., Allentown, Pa.

[21] Appl. No.: 463,477

[22] Filed: Jun. 5, 1995

Related U.S. Application Data

[62] Division of Ser. No. 345,164, Nov. 28, 1994, Pat. No. 5,489,630.

[51] Int. Cl.$^6$ .............................. C08K 3/20; C08L 63/02; C08L 63/04
[52] U.S. Cl. ............................. 523/404; 528/111
[58] Field of Search .............................. 523/404; 528/111

[56] References Cited

U.S. PATENT DOCUMENTS

| | | | |
|---|---|---|---|
| 4,197,389 | 4/1980 | Becker et al. | 528/252 |
| 4,246,148 | 1/1981 | Shimp et al. | 260/260 |
| 4,315,044 | 2/1982 | Elmore et al. | 427/260 |
| 4,446,256 | 5/1984 | Hicks | 523/528 |
| 4,608,405 | 8/1986 | DeGooyer | 523/528 |
| 4,608,406 | 8/1986 | Williams et al. | 523/523 |
| 5,032,629 | 7/1991 | Hansen et al. | 523/523 |
| 5,246,984 | 9/1993 | Darwen et al. | 523/528 |
| 5,280,091 | 1/1994 | Dubowik et al. | 525/525 |

FOREIGN PATENT DOCUMENTS

| | | |
|---|---|---|
| 2519390 | 11/1975 | Germany . |
| 4206392 | 2/1992 | Germany . |
| 1326435 | 7/1990 | United Kingdom . |

*Primary Examiner*—Melvyn I. Marquis
*Assistant Examiner*—D. Aylward
*Attorney, Agent, or Firm*—Michael Leach

[57] ABSTRACT

A new epoxy hardener composition is the product of the reaction of (A) a poly(alkylene oxide) monoamine or diamine with a molecular weight (Mn) of about 500 to 6000 and (B) a di- or polyepoxide, in a ratio of epoxide to active amine hydrogens of about 1.1:1 to 6:1 to yield an intermediate (C), which in a second step is reacted with (D) a di- or polyamine, in a ratio of active amine hydrogens to epoxide of greater than about 25 to 1, preferably greater than about 30 to 1. The compositions of the invention are excellent emulsifiers of liquid epoxy resins in aqueous medium without the addition of added surfactants or acidic compounds, and can be used to prepare water resistant water-borne coatings and related products from both liquid and solid epoxy resins, that possess long pot lives and contain relatively small amounts of volatile organic compounds.

22 Claims, No Drawings

SELF-EMULSIFYING EPOXY CURING AGENT

This is a continuation of application Ser. No. 08/345,164 filed 28 Nov. 1994, U.S. Pat. No. 5,489,630.

TECHNICAL FIELD

This invention relates to water dispersible polyamine-epoxy adducts which can be used as a curative for both liquid and solid epoxy resin systems.

BACKGROUND OF THE INVENTION

Coatings based on a combination of epoxy resins and amine hardeners (curing agents) which react to form a crosslinked film have enjoyed widespread use for decades. Because of the combination of properties achievable they have developed strong market positions in those applications where a high degree of resistance to water, chemical reagents, or corrosive environments is required.

A good introduction to the general chemistry of epoxy resins is available in H. Lee and K. Neville, "Handbook of Epoxy Resins" (1967, McGraw-Hill Inc.). Commercially available epoxy resins useful in coatings are frequently referred to as either liquid resin or solid resin. The commercially important solid epoxy resins have an epoxy equivalent weight (EEW) greater than about 450. Although much higher EEW epoxy resins are available, the resins employed in amine cured coatings generally have an EEW less than about 1000. At higher equivalent weights the resulting crosslink density is too low to give the desired properties. Commercially important liquid epoxy resins have an EEW of less than about 250, and more frequently less than about 200. Though much slower to dry than solid epoxies, they result in films with very high crosslink densities, and find utility where very chemically resistant coatings are required. Of course, they also require less solvent for application than traditional solvent borne formulations. There is also a class of epoxy resins sometimes referred to as semi-solid resins, with EEWs intermediate between liquid and solid. It should be realized that a reference to 'liquid' or 'solid' resin may refer not to the actual physical state of the resin, but to the resin's EEW range, and perhaps to the properties that may be anticipated with its use. Thus, an aqueous dispersion of an epoxy resin with an EEW of 500 may be referred to as a solid resin dispersion, even though it is in a liquid form.

Concerns over environmental pollution and the health dsks associated with chemical exposure have resulted in an intense effort by coatings manufacturers and raw material suppliers to develop products that have lower volatile organic content (VOC). Solvents are required in coatings to, among other things, allow the inherently viscous materials which comprise the coating formulation to be applied in a manner that results in a continuous thin film that will harden or cure with the required appearance and physical properties. No single approach to reducing the solvent content in two component epoxy coatings has been found which results in a product with the high degree of performance in different applications that typify the traditional, high VOC products.

One method of lowering VOC is to replace some of the solvent with water. This approach has not been without drawbacks. They include an increased sensitivity of water-borne epoxies to water and corrosive environments, and relatively short pot lives.

It will also be appreciated by those skilled in the art that replacing a substantial amount of solvent with water does not result in a true solution of the film forming components of an epoxy coating. To prevent phase separation and maintain a dispersed state of colloidal dimensions, it is necessary to impart an energy barrier to the agglomeration of the colloidal particles. There are two generally recognized means to accomplish this. The first is to surround the particles with electrically charged species of like sign. In water-borne epoxy coatings it is possible to incorporate charged species with the use of ionic surfactants, but more commonly this is accomplished by adding a compound of sufficient acidity to react with the amine to form a substantial equilibrium concentration of alkyl ammonium ion. Acids such as acetic acid and the like are frequently employed. Such an approach is employed in U.S. Pat. No. 4,246,148; U.S. Pat. No. 4,539,347; U.S. Pat. No. 4,608,405 and U.S. Pat. No. 5,246,984. Adding acids such as acetic acid or increasing their use level in some cases can also enhance the pot life of a water-borne epoxy, probably either by slowing the overall rate of the amine/epoxy reaction, or by imparting additional colloidal stability. In some cases, the ammonium containing curing agent is combined with already emulsified epoxy resins such as those described below, or in some cases the ammonium containing curing agent is used to directly emulsify the epoxy resin. Unfortunately, water-borne epoxy coatings made by this approach do not have the same degree of water and corrosion resistance of traditional epoxy coatings. Also, systems that rely on the ammonium containing curing agent as the primary emulsifier of the epoxy resin tend to suffer from quite short pot lives.

The other general method of imparting colloidal stability in an aqueous environment is to surround the particles with polymeric chains, such as polyethylene oxide chains, which have a high degree of water solubility. One way of practicing this method of stabilization is to add a conventional nonionic surfactant to the epoxy resin. There are commercially available products that consist of a pre-emulsified combination of low molecular weight (liquid) epoxy resin and nonionic surfactant, or a similar combination which is emulsified by the resin user. Sometimes, special block copolymer surfactants are employed that are designed to have one block highly compatible with the epoxy resin employed, such as described in U.S. Pat. No. 4,446,256.

A different method for nonionic stabilization can be employed as disclosed in U.S. Pat. No. 4,315,044 and U.S. Pat. No. 4,608,406. The diglycidyl ether of a poly(alkylene oxide) diol is incorporated in the epoxy resin advancement of a diphenol and a di- or polyglycidyl ether. In this way, water soluble chains become chemically attached to the advanced, solid epoxy resin, which is then converted into an aqueous dispersion by the addition of water and co-solvents and the application of shear.

Also known in the art are water-borne poly(alkylene oxide) epoxy hardeners with chemically attached nonionic emulsifying chains. A hardening agent for an aqueous epoxy resin composition comprising a reaction product of (a) at least one polyepoxide compound, (b) at least one polyalkylene polyether polyol and (c) at least one compound selected from the group consisting of aliphatic, cycloaliphatic, and heterocyclic polyamines is described in U.S. Pat. No. 4,197,389.

A curing agent for epoxy resins showing good water compatibility is described in DE 4,206,392. It consists of (A) polyamidoamines obtained by polycondensation of (a) dicarboxylic acids that contain oxyalkylene groups or their derivatives with (b) polyamines that contain at least two amino groups condensable with (a), (B) polyamines with at least two secondary amino groups and (C) adducts from (c) polyepoxide compounds and (d) polyalkylene polyether polyols.

A water-borne polyamide curing agent which is made by reacting a polycarboxylic acid with polyamines is described in DE 2,519,390. At least 10 mole % of the polyamines are poly(alkylene oxide) amines.

Water-borne epoxy curing agents which are essentially adducts of diglycidyl ethers of polyethers with polyamines are described in GB 1,326,435. Exemplary amines are the polyethylene amines.

U.S. Pat. No. 5,032,629 describes a hardening agent for epoxy resins which is prepared in two steps. In the first step at least one member of the group consisting of polyalkylene polyether monoamines and diamines and polyamines with a mean molecular weight of 148 to 5000 is reacted with at least one member of the group consisting of diepoxy compounds and polyepoxy compounds in a ratio of hydrogen atoms bound to nitrogen and capable of reaction with epoxide to epoxides of di- or polyepoxy compounds of 1:1.4 to 6. In the second step, at least one member of the group consisting of primary and secondary aliphatic, araliphatic, cycloaliphatic, aromatic, and heterocyclic mono-, di- and polyamines is reacted with the product of the first step at a ratio of reactive epoxide groups to hydrogen atoms on nitrogen of 1:2 to 10. Example 10, according to calculations, shows reacting a diamine with the first step product of Example 7 in a ratio of reactive epoxide groups to hydrogens on nitrogen of about 1:21.

SUMMARY OF THE INVENTION

The present invention provides water compatible poly(alkylene oxide)amine-epoxy adducts and curable coating compositions comprising a blend of such poly(alkylene oxide)amine-epoxy adduct and a polyepoxide.

The poly(alkylene oxide)amine-epoxy adduct comprises the reaction product of (A) a poly(alkylene oxide) mono- or diamine having a number average molecular weight (Mn) of 500 to 3000 and (B) a polyepoxide in a ratio of epoxide groups to active amine hydrogen atoms of about 1.1:1 to 6:1 to yield an intermediate (C) which is reacted with (D) a polyamine in a ratio of active amine hydrogen atoms to epoxide groups of >25:1, preferably >30:1. The amount of the poly(alkylene oxide) monoamine or diamine used to produce intermediate (C) should be sufficient to provide a stable solution or emulsion of the epoxy hardener composition in an aqueous medium, i.e., in water or a water-cosolvent mixture. Reactive amine hydrogen atoms are those hydrogen atoms bonded to an amine nitrogen atom which are capable of reacting with an epoxide.

This resulting poly(alkylene oxide)amine-epoxy adduct is readily dispersible in the aqueous media and is capable of dispersing liquid and solid polyepoxide resins in such aqueous media. Thus, another embodiment of the present invention is a curable coating composition comprising the poly(alkylene oxide)amine-epoxy adduct and a polyepoxide.

The compositions of this process are similar to those of U.S. Pat. No. 5,032,629 except that employing a ratio of epoxy to amine hydrogen in the second step in excess of that taught in U.S. Pat. No. 5,032,629, has surprisingly afforded coatings with better humidity resistance, higher volume solids, and much longer pot life.

The poly(alkylene oxide)amine-epoxy adducts are excellent emulsifiers of liquid polyepoxide resins in water without the addition of added surfactants or acidic compounds and can be used to prepare water resistant water-borne coatings and related products from both liquid and solid polyepoxide resins that possess long pot lives and contain relatively small amounts of VOC.

DETAILED DESCRIPTION OF THE INVENTION

According to the invention the poly(alkylene oxide)amine-epoxy adduct comprises the reaction product of (A) a poly(alkylene oxide) monoamine or diamine having a number average molecular weight (Mn) of 500 to 3000 and (B) a polyepoxide in a ratio of epoxide groups to active amine hydrogens of about 1.1:1 to 6:1 to yield an intermediate (C). The amount of poly(alkylene oxide) monoamine or diamine used in producing intermediate (C) represents that amount sufficient to afford stable solutions or emulsions of the final curing agent in an aqueous medium, and to afford an emulsion of the curing agent and epoxy resin in an aqueous medium with sufficient stability to be a useful coating vehicle, e.g., 15 to 40 wt %, preferably 18 to 30 wt %, of the final hardener composition solids. In a second step intermediate (C) is reacted with (D) a polyamine in a ratio of active amine hydrogens to epoxide groups of >25:1, preferably >30:1.

The poly(alkylene oxide) amines used in the first step comprise poly(alkylene oxide) chains that are terminated on one end or on both ends with amine groups, monoamines and diamines, respectively. It is necessary that the amine groups have at least one active hydrogen; i.e., they must be 1° or 2° amines. The monoamines are preferred to the diamines, because at equivalent molecular weights, their use should result in lower viscosity hardeners, and because it is believed that the monofunctional chains are more effective stabilizers at equal molecular weight. The poly(alkylene oxide) can be derived from ethylene oxide, propylene oxide, or butylene oxide, or mixtures of the above either in random or block copolymer forms. However, it is necessary that the poly(alkylene oxide) chains, or at least suitably long sections of these chains to act as steric stabilizers, be soluble in the continuous phase medium of the final coating formulation. Thus, as the VOC of the final formulation is reduced by elimination of cosolvent, it will be necessary to raise the level of ethylene oxide in the copolymer, since it is the only poly(alkylene oxide) that is completely water soluble at the necessary molecular weights. The number average molecular weight (Mn) of the poly(alkylene oxide) amine is about 500 to about 3000, preferably about 800 to about 1500. Lower molecular weights result in colloidal instability, while higher molecular weights increase viscosity of the product and require lower solids in the final formulation.

Specific examples of suitable monoamines are the Jeffamine® M-600, Jeffamine M-1000, Jeffamine M-2005, and Jeffamine M-2070 amines. Specific examples of suitable diamines are Jeffamine Do2000, Jeffamine ED-600, Jeffamine ED-900, and Jeffamine ED-2001 amines. The Jeffamine materials are commercially available from the Huntsman Corp. The preferred monoamine is Jeffamine M-1000 amine which is a monoamine terminated block copolymer of propylene oxide and ethylene oxide having an Mn=1200, based on its amine titer.

The poly(alkylene oxide) amine can range from about 15% to about 40% of the final hardener composition (based on solids). If too little poly(alkylene oxide) amine is employed, the hardener has insufficient solubility in the continuous phase of the formulation, resulting in inadequate pot life and stability. At high levels, water resistance of the derived coatings will be adversely affected. The preferred range is about 18% to about 30%, and most preferably about 20%.

The epoxy component of the first step can be any polyepoxide containing about 2 or more 1,2-epoxy groups per molecule. Such epoxides are described in Y. Tanaka, "Synthesis and Characteristics of Epoxides", in C. A. May, ed., *Epoxy Resins Chemistry and Technology* (Marcel Dekker, 1988). Examples include epoxides of polyunsaturated organic compounds, oligomers of epihalohydrins, glycidyl derivatives of hydantoin and hydantoin derivatives, glycidyl ethers of polyvalent alcohols, glycidyl derivatives of triazines, and glycidyl ethers of dihydric phenols. Epoxides of polyunsaturated organic compounds include divinyl benzene, cyclohexadiene, cyclooctadiene, dicyclopentadiene, cyclododecadiene, cyclododecatriene, isoprene, 1,5-hexadiene, butadiene, polybutadiene, polyisoprene, and the like. Glycidyl ethers of polyvalent alcohols include glycidyl ethers of neopentyl, ethylene, propylene, and butylene glycol, trimethylolpropane, 2-ethyl-1,3-hexanediol, 2,2-diethyl-1,3-propanediol, 2-butyl-2-ethyl-1,3-propanediol, 1,6-hexanediol, 1,4-butanediol, 1,3-propanediol, 1,5-pentanediol, 1,8-octanediol, 1,10-decanediol, 1,12-dodcecanediol, 1,2-cyclohexanediol, 1,4-cyclohexanediol, 1,4-cyclohexane dimethanol, glycerin, sorbitol, pentaerythritol, and the like. Glycidyl ethers of polymeric polyvalent alcohols are also suitable and include the glycidyl ethers of polyethylene glycol, polypropylene glycol, polybutylene glycol, the various copolymers of ethylene, propylene, and butylene oxides, polyvinyl alcohol, polyallyl alcohol, and the like. The glycidyl derivatives include triglycidyl isocyanurate.

The glycidyl derivatives of hydantoin and hydantoin derivatives include structures shown below where R1 and R2 are alkyl chains of 1 to 4 carbons, or R1 and R2 represent a single tetramethylene or pentamethylene chain.

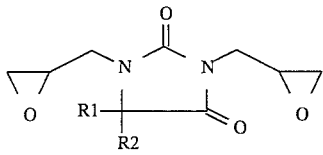

Glycidyl ethers of polyhydric phenols include the glycidyl ethers of dihydric phenols, including resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (more commonly known as bisphenol A), and bis-(4-hydroxyphenyl)-methane (more commonly known as bisphenol F, and which may contain varying amounts of 2-hydroxyphenyl isomers), and the like. Also useful are the advanced dihydric phenols of the following structure:

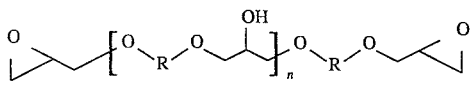

where n is an integer, and R is a divalent hydrocarbon radical of a dihydric phenol, such as the dihydric phenols listed above. Such materials are prepared by polymerizing mixtures of the dihydric phenol and epichlorohydrin, or by advancing a mixture of the diglycidyl ether of the dihydric phenol and the dihydric phenol. While in any given molecule the value of n is an integer, the materials are invariably mixtures which can be characterized by an average value of n which is not necessarily a whole number. Useful in this invention are polymers with a value of n between 0 and about 7. Also useful in this invention are the epoxy novolac resins, which are the glycidyl ethers of novolac resins. Novolac resins are the reaction product of a mono or dialdehyde, most usually formaldehyde, with a mono or polyphenolic material. Examples of monophenolic materials which may be utilized include phenol, the cresols, p-tert-butylphenol, nonylphenol, octylphenol, other alkyl and phenyl substituted phenols, and the like. Polyphenolic materials include the various diphenols including bisphenol-A and the like. Aldehydes which are utilized for the novolac include formaldehyde, glyoxal, and the higher aldehydes up to about $C_4$. The novolacs typically are complex mixtures with different degrees of hydroxyl functionality. For the purposes of this invention useful functionalities range from about 2 to about 4.

The preferred polyepoxy compounds are the diglycidyl ethers of bisphenol-A and bisphenol-F, advanced bisphenol-A resins where n is between about 0.1 and about 3, and epoxy novolacs derived from phenol and formaldehyde with an average functionality of about 2 to about 4. Most preferred are diglycidyl ethers of bisphenol-A and diglycidyl ethers of bisphenol-F.

The ratio of equivalents of epoxy resin to equivalents of active amine hydrogen in the first step of the process should be kept high enough so that not too many copolymers are formed that have two or more polyether chains attached to a single di- or multifunctional epoxy resin, which would be expected to reduce water resistance. It should be kept low enough so that the required level of poly(alkylene oxide) is incorporated into the composition while ensuring that the viscosity of the final product is low enough to produce workable compositions below the required VOC. Accordingly, the ratio of epoxy groups to active amine hydrogens should be about 1.1:1, preferably 1.3:1, to about 6:1, with the preferred range being about 1.5:1 to about 2.5:1.

Polyamines useful in the second step contain at least two nitrogen atoms per molecule and at least two and preferably at least three active hydrogens attached to nitrogen atoms per molecule. Useful amines include aliphatic, araliphatic, aromatic, cycloaliphatic, and heterocyclic di- and polyamines. Examples include the polyethylene amines (ethylene diamine, diethylene triamine, triethylene tetramine, pentaethylene hexamine and the like), 1,2-propylene diamine, 1,3-propylene diamine, 1,4-butanediamine, 1,5-pentanediamine, 1,3-pentanediamine, 1,6-hexanediamine, 3,3,5-trimethyl-1,6-hexanediamine, 3,5,5-trimethyl-1,6-hexanediamine, 2-methyl-1,5-pentanediamine, bis-(3-aminopropyl)amine, N,N'-bis-(3-aminopropyl)- 1,2-ethanediamine, N-(3-amino-propyl)-1,2-ethanediamine, 1,2-diaminocyclohexane, 1,3-diaminocyclohexane, 1,4-diaminocyclohexane, aminoethylpiperazine, the poly(alkylene oxide) diamines and triamines (such as for example Jeffamine® D-230, Jeffamine D-400, Jeffamine D-2000, Jeffamine D-4000, Jeffamine T-403, Jeffamine EDR-148, Jeffamine EDR-192, Jeffamine C-346, Jeffamine ED-600, Jeffamine ED-900, and Jeffamine ED-2001 ), meta-xylylene diamine, phenylene diamine, 4,4'-diaminodiphenyl methane, toluene diamine, isophorone diamine, 3,3'-dimethyl-4,4'-diaminodicyclohexyl methane, 4,4'-diaminodicyclohexyl methane, 2,4'-diaminodicyclohexyl methane, the mixture of methylene bridged poly(cyclohexyl-aromatic)amines (also known as MBPCAA) described in US 5,280, 091, and polyaminoamides. Mixtures of the above amines may also be employed.

The preferred amines for use in the invention are 4,4'-diaminodicyclohexyl methane, and particularly the mixture of methylene bridged poly(cyclohexylaromatic)amines described in U.S. Pat. No. 5,280,091.

If desired, the amine hydrogen functionality of the first or second amine component or their combined product can be reduced in order to further improve pot life by reducing the reactivity of the amine or enhancing the compatibility of the curing agent with the epoxy resin. This can be accomplished in several ways well known to those skilled in the art. The first method is to react a portion of the amine hydrogen with a monoepoxide. Examples of useful monoepoxides include styrene oxide, cyclohexene oxide, ethylene oxide, propylene oxide, butylene oxide, and the glycidyl ethers of phenol, the cresols, tert-butylphenol and other alkyl phenols, butanol, and 2-ethylhexanol and the like. The second method is to react a portion of the amines with an aidehyde containing about 1–8 carbons, such as formaldehyde, butyraldeyde, benzaldehyde, and the like. A third method is to condense a portion of the amines with a monocarboxylic acid having from 1 to about 18 carbons such as acetic acid, benzoic acid, or one of the fatty acids such as stearic acid or oleic acid. A fourth method is to react a portion of the amines with an unsaturated compound that contains an electron withdrawing group that activates the double bond to undergo the Michael reaction with an amine. Examples of useful unsaturated compounds of this type include acrylonitrile, acrylamide, N-methlyol acrylamide, and the like.

The ratio of equivalents of amine hydrogen to equivalents of epoxy in the final step must be kept high enough so that the molecular weight of the product is not built up to too great an extent, causing a too high viscosity. -However, it must be kept low enough to achieve the desired level of poly(alkylene oxide) amine content in the hardener. It will be apparent to those skilled in the art that the first requirement is dependent upon the functionality of the components in the reaction, since the reaction of materials of high functionality leads to higher molecular weights than lower functionality materials at the same molar ratios. The minimum ratio of equivalents of amine hydrogen to equivalents of epoxy is about 25, with the preferred minimum ratio being about 30.

If desired, additional polyamine, the same or different, may be blended into the hardener composition after the second reaction is complete.

Also contemplated as the functional equivalent to the second step of reacting the total amount of polyamine with the epoxy-containing intermediate (C), is to divide the total polyamine amount into two portions, the first being an amount sufficient to provide an active amine hydrogen to epoxy group ratio of at least >25. This first portion is reacted in the second step with the epoxy-containing intermediate (C) followed by the addition of the remaining, or second portion, of the polyamine to the hardener composition after the second reaction is complete.

Normally, to blend additional polyamine into the product of the second reaction would result in a higher viscosity product than would be obtained if all of the polyamine were present when the epoxy-containing intermediate is added. However, it will be recognized by those skilled in the art that the difference will be slight as long as a large molar excess of amine to epoxy is present in the first portion.

Furthermore, it is possible to impart certain desirable properties to the final coating by blending in amines that have different properties than the amine used in the reaction with the polyepoxide and poly(alkylene oxide) amine. For example, the flexibility and impact resistance of the coating can be improved by blending in a portion of Jeffamine D400 or D2000 amine. When blending in additional amines, it is important that the final level of poly(alkylene oxide) amine in the resulting product be sufficient to impart the necessary stability to the system as described above.

Both reactions in the preparation of the hardener can be conducted over a wide temperature range, from about 40° C. to 200° C., with the preferred temperature about 60° C. to 100° C. To minimize viscosity of the final product, it is preferred to add the poly(alkylene oxide) amine to the epoxide in the first step, and to add the resulting intermediate to the polyamine in the second step. The reaction can be conducted neat, or in the presence of suitable solvent. The best solvents are solvents that are useful in the formulation of the final coating, such as those described below. The preferred solvents are the glycol ethers described below, and the most preferred solvent is ethylene glycol monopropyl ether (EP).

The curing agents, or hardeners, of this invention are useful in applications requiring a relatively thin film of cured epoxy resin, such as coatings and adhesives. They are used to cure resins or mixtures of resins containing 1,2-epoxy groups. The epoxy resins or epoxy resin mixture may be liquid or solid in nature, and have an epoxide equivalent weight (EEW) based on solids of from about 150 to about 1000, preferably from about 156 to about 700. Usually the resin mixture will consist of di- or polyepoxide resins, such as those resins previously listed as suitable for use in making the poly(alkylene oxide) amine/epoxide adduct. The epoxy resin mixture may be modified with a portion of monofunctional epoxides such as those also listed above.

The epoxy resin may be used as is, it may be dissolved in an appropriate solvent, or it may be employed as an already formed emulsion in water or water/cosolvent blend. It will be recognized by those skilled in the art that the use of solvent or a water/cosolvent blend may be required with solid epoxy resins or extremely viscous liquid epoxy resins. The ratio of epoxy groups in the epoxy resin to active amine hydrogens in the hardener can vary from about 0.5 to about 2, and will depend on the nature of the epoxy resin employed and the properties necessary to meet a certain market requirement. With liquid resin, the preferred range is about 0.9 to 1.3, and with solid resin about 1.2 to 1.6.

Normally, coatings according to this invention will consist of at least two components, one of which contains the epoxy resin, and the other the curing agent. It will usually be advantageous to include one or more organic solvents in one or both components of the coating. The solvents are employed to, for example, reduce the viscosity of the individual or combined components, to reduce the surface tension of the formulation, to aid in coalescence of the ingredients for optimum film formation, to increase pot life, and to increase the stability of one or both components. Particularly useful solvents are the lower molecular weight glycol ethers such as ethylene glycol monopropyl ether, ethylene glycol monobutyl ether, ethylene glycol monoethyl ether, propylene glycol monomethyl ether, propylene glycol monoethyl ether, diethylene glycol monobutyl ether, and the like. Other useful solvents include the aromatic solvents such as xylene and aromatic solvent blends such as Aromatic 100, ketones such as methyl ethyl ketone, methyl isobutyl ketone, esters such as butyl acetate, and alcohols such as isopropyl alcohol and butanol. The preferred solvent is ethylene glycol monopropyl ether (EP).

It will frequently be advantageous to include plasticizers such as benzyl alcohol, phenol, tert-butylphenol, nonylphenol, octylphenol, and the like in one or both of the components. Plasticizers reduce the glass transition temperature of the composition and therefore allow the amine and epoxide to achieve a higher degree of reaction than might otherwise be possible. Accelerators for the epoxy/amine reaction may be employed in the formulation. Useful accelerators are well known to those skilled in the art and include acids such as salicylic acid, various phenols, various carboxylic acids, and various sulfonic acids, and tertiary amines such as tris-(dimethylaminomethyl)phenol.

The coating formulation may also include pigments and mixtures of pigments. The pigments may be ground into the epoxy resin, the hardener, or both. They may also be incorporated with the use of a pigment grinding aid or pigment dispersant, which may be used in combination with the epoxy resin or the hardener, or may be used alone. The use of pigment dispersants is well known to those skilled in the art of coating formulation.

Other additives may also be included in the coatings formulation. Such additives include defoamers, surfactants, slip and mar aids, rheology modifiers, flow aids, adhesion promoters, light and heat stabilizers, corrosion inhibitors, and the like.

Example 1

Into a 500 mL 4NRB flask equipped with a mechanical stirrer, heating mantle, nitrogen inlet, addition funnel, and thermocouple were placed 25.0 g of Ektasolve EP and 53.1 g (279 meq. of epoxide) of Epon 828 epoxy resin (eq. wt.=190). The addition funnel was charged with 25.0 g of EP and 100.0 g of Jeffamine M1000 amine (available from the Huntsman Corp., 83 meq. 1° amine, 28.4% of composition based on solids). According to the manufacturer, the Jeffamine M1000 amine had a 1° amine content of 0.83 meq/g and a total amine content of 0.85 meq/g. This corresponds to a number average molecular weight (Mn) of about 1200, based on titer, and the ratio of epoxy groups to amine hydrogens in the reaction is 1.68:1. With stirring, the amine was added to the epoxy resin over about 5 minutes. The temperature was raised to 85° C. and held at that temperature for 4 hours. At this time, integration of the oxirane band at 916 cm$^{-1}$ in the IR spectrum indicated that consumption of the epoxide had ceased or at least become very slow. The contents of the flask were transferred to an addition funnel, and the intermediate was then added to 199.2 g (3600 meq. of N—H) of a mixture of methylene bridged poly(cyclohexyl-aromatic)amines (MBPCAA, N—H eq. wt. =55) which was pre-heated to 80° C. in a 1000 mL 4NRB flask equipped like the 500 mL flask above. This corresponds to an amine hydrogen to epoxy ratio in this step of 32.11:1, assuming all of the amine hydrogen in the first step was consumed. After two more hours at 80° C, the reaction mixture was allowed to cool to room temperature. The viscosity was 5350 cPs (CP52 spindle, 1.5 rpm, 40° C.), the calculated amine hydrogen equivalent weight was 114.7, and the % solids (1 hr., 110° C.) was 87.3%. When reduced to 80% non-volatiles (NV) with additional Ektasolve EP, the viscosity was 326 cPs (CP52 spindle, 1.5 rpm, 60°).

Examples 2–6.

The curing agents of Table I were prepared according to the procedure of Example 1.

TABLE 1

| Example | 2 | 3 | 4 | 5 | 6 |
|---|---|---|---|---|---|
| Jeffamine M1000[1] | 170.34 | 170.34 | 170.34 | 525.00 | |
| Jeffamine M2070[2] | | | | | 170.34 |
| Epon 828[3] | 120.00 | 150.00 | 191.10 | 278.78 | 90.42 |
| MBPCAA[4] | 309.66 | 279.66 | 238.56 | 508.72 | 339.24 |
| Ektasolve EP | 150.00 | 150.00 | 150.00 | 187.5 | 150 |
| AHEW[5] | 142.0 | 163.8 | 207.5 | 173.4 | 128.29 |
| AHEW (Based on % Solids) | 113.6 | 131.1 | 166.0 | 151.7 | 102.62 |
| % Jeffamine Based on Solids | 28.4 | 28.4 | 28.4 | 40.0 | 28.4 |
| Ratio of epoxy to amine hydrogen, 1st step | 2.22 | 2.78 | 3.54 | 1.67 | 3.33 |
| Ratio of amine hydrogen to epoxy, 2nd step | 16.19 | 10.06 | 6.01 | 15.62 | 18.5 |
| Viscosity (CP52 spindle, 1.5 rpm, 60° C.) | 682 cPs | 1413 cPs | 3532 cPs | 461 cPs[6] | 528.4 |
| % NV (1 hr, 100° C.) | 80.1 | 81.1 | 79.4 | 88.1 | 79.4 |

[1] Poly(alkylene oxide) amine - Huntsman Corp., 0.83 meq/g 1° amine; Mn = 1200.
[2] Poly(alkylene oxide) amine - Huntsman Corp., 0.42 meq/g 1° amine; Mn = 2400.
[3] Liquid epoxy resin - Shell Chemical Co., EEW = 190.
[4] Mixture of methylene bridged poly(cyclohexyl-aromatic)amines
[5] Amine Hydrogen Equivalent Weight
[6] After reduction to 80% NV with additional EP.

Examples 7–8.

The curing agents of Table 2 were prepared by blending the curing agent of Example 1 with additional MBPCAA and solvent.

TABLE 2

| Example | 7 | 8 |
|---|---|---|
| Curing agent of Example 1 | 158.60 | 422.70 |
| MBPCAA | 123.86 | 155.28 |
| Ektasolve EP | 17.59 | 22.02 |
| AHEW | 82.5 | 92.19 |
| AHEW (Based on % Solids) | 72.3 | 80.76 |
| % Jeffamine M1000 Based on Solids | 15.0 | 20.0 |
| Viscosity | 322.5[1] | 304.1[1] |
| % NV (1 hr, 110° C.) | 87.0 | 87.7 |

[1] After reduction to 80% NV with additional EP.

Examples 9–23,

The A side (containing the epoxy resin) and B side (containing the hardener) clearcoat formulations of Table 3 were prepared. All of these formulations are calculated to be 65% solids by weight, including the nonylphenol plasticizer as solids, and have a 200 g total batch weight. The level of EP has been adjusted to yield the calculated VOC indicated. The formulations were allowed to equilibrate for at least 15 hours. The mixtures were then combined by adding the B side to the A side and thoroughly mixing. After standing for a 30 minute induction period, the mixtures were reduced in viscosity by the addition of deionized water to a spray viscosity of about 25 sec in a Zahn #2 cup. Coatings were prepared by drawdown using a #50 wire wound rod (Paul N. Gardner Co.) on 3"×6" (7.62 cm×15.24 cm) polished cold rolled steel (Q Panel Co.) or 3"×6" (7.62 cm×15.24 cm) 16 ga. grit blasted hot rolled steel with a 2 mil profile (Custom Lab Specialties Co.). Pot lives were determined by the time necessary to obtain about a 10% drop in gloss of coatings applied every half hour to cold rolled steel (GL), by the time required for the viscosity to double (V), or by the time necessary for the composition to become phase separated to the extent that an accurate measure of viscosity could not be taken in the Zahn cup (PS), whichever was a shorter time. The indicated pot lives do not include the 30 minute induction time as part of the pot life. Humidity resistance was measured using a Cleveland Condensing Humidity test (ASTM D 4585) operating with a cycle of 10 hr. wet at 40° C./2 hr. dry at 45° C. Panels were rated for visual estimation of the degree of rusting (ASTM D 610) and blistering (ASTM D 714). Performance data is collected in Table 4.

TABLE 3

| Example | 9 | 10 | 11 | 12 | 13 | 14 | 15 | 16 |
|---|---|---|---|---|---|---|---|---|
| A Side | | | | | | | | |
| Epoxy Resin, EEW = 190 | 83.32 | 79.18 | 82.28 | 84.71 | 73.83 | 78.32 | 78.33 | 75.28 |
| Nonylphenol | 16.92 | 16.92 | 15.68 | 9.05 | 16.93 | 16.92 | 16.93 | 16.92 |
| Aromatic 100 | 1.67 | 1.58 | 1.65 | 1.69 | 1.48 | 1.57 | 1.57 | 1.51 |
| B Side | | | | | | | | |
| Hardener of Ex. 1 | | | | | 44.57 | 39.4 | 39.41 | |
| Hardener of Ex. 2 | | | | | | | | 46.89 |
| Hardener of Ex. 3 | | | | | | | | |
| Hardener of Ex. 4 | | | | | | | | |
| Hardener of Ex. 5 | | | | | | | | |
| Hardener of Ex. 6 | | | | | | | | |
| Hardener of Ex. 7 | | | | | | | | |
| Hardener of Ex. 8 | 33.68 | 38.41 | 36.29 | 41.09 | | | | |
| MBPCAA | | | | | | | | |
| Jeffamine D400 | | | | | | | | |
| DI Water | 49.99 | 57.41 | 53.81 | 50.15 | 49.83 | 57.41 | 49.90 | 50.83 |
| EP | 14.16 | 6.26 | 10.04 | 13.05 | 13.14 | 6.14 | 13.63 | 9.15 |
| Dee-Fo PI4 Concentrate | 0.25 | 0.25 | 0.25 | 0.25 | 0.25 | 0.25 | 0.25 | 0.25 |
| B Side Viscosity (cP, 26° C.) | 37.5 | | | | 71 | | 72.5 | 240 |
| DI Water to Reduce to 25 sec Viscosity | 14.8 | 0 | 17.59 | 40.45 | 47.89 | 14.78 | 31.84 | 28.4 |
| Calculated Constants | | | | | | | | |
| % Plasticizer on Solids | 15 | 15 | 13.75 | 7.5 | 15 | 15 | 15 | 15 |
| Eq Epoxy/Eq. N—H | 1.2 | 1.0 | 1.1 | 1.0 | 1.0 | 1.2 | 1.2 | 1.2 |
| VOC (lb/gal) | 1.20 | 0.8 | 1.00 | 1.20 | 1.20 | 0.8 | 1.20 | 1.20 |
| % Volume Solids at 25 sec Viscosity | 57.5 | 62.3 | 56.8 | 50.9 | 49.6 | 57.8 | 53.2 | 54.2 |

| Example | 17 | 18 | 19 | 20 | 21 | 22 | 23 |
|---|---|---|---|---|---|---|---|
| A Side | | | | | | | |
| Epoxy Resin, EEW = 190 | 71.33 | 65.52 | 84.51 | 77.93 | 67.77 | 79.68 | 81.82 |
| Nonylphenol | 16.93 | 16.93 | 13.12 | 16.92 | 16.93 | 16.93 | 16.92 |
| Aromatic 100 | 1.43 | 1.31 | 1.69 | 1.56 | 1.36 | 1.59 | 1.64 |
| B Side | | | | | | | |
| Hardener of Ex. 1 | | | | | | 25.62 | 23.94 |
| Hardener of Ex. 2 | | | | | | | |
| Hardener of Ex. 3 | 51.25 | | | | | | |
| Hardener of Ex. 4 | | 59.62 | | | | | |
| Hardener of Ex. 5 | | | | | 51.54 | | |
| Hardener of Ex. 6 | | | | 43.88 | | | |
| Hardener of Ex. 7 | | | 36.71 | | | | |
| Hardener of Ex. 8 | | | | | | | |
| MBPCAA | | | | | | 3.46 | 6.63 |
| Jeffamine D400 | | | | | | 7.27 | 3.40 |
| DI Water | 49.93 | 49.93 | 50.03 | 50.03 | 49.81 | 49.8 | 49.87 |
| EP | 8.92 | 6.49 | 13.69 | 9.40 | 12.43 | 15.42 | 15.55 |
| Dee-Fo PI4 Concentrate | .25 | .25 | .25 | .25 | .25 | .25 | .25 |

TABLE 3-continued

| | | | | | | | |
|---|---|---|---|---|---|---|---|
| B Side Viscosity (cP, 26° C.) | 2620 | 117000 | | | | | |
| DI Water to Reduce to 25 sec Viscosity | 50.66 | | 57.92 | 12.01 | 47.73 | 88.05 | 21.37 | 21.24 |
| Calculated Constants | | | | | | | | |
| % Plasticizer on Solids | 15 | 15 | 11.25 | 15 | 15 | 15 | 15 |
| Eq Epoxy/Eq. N—H | 1.2 | 1.2 | 1.0 | 1.2 | 1.2 | 1.2 | 1.2 |
| VOC (lb/gal) | 1.20 | 1.20 | 1.20 | 1.20 | 1.20 | 1.20 | 1.20 |
| % Volume Solids at 25 sec Viscosity | 49.2 | 47.9 | 58.2 | 49.7 | 42.6 | | |

TABLE 4

| Example | 9 | 10 | 11 | 12 | 13 | 14 | 15 | 16 |
|---|---|---|---|---|---|---|---|---|
| Dry-to-touch (hr.) | 3.25 | 3 | 2.75 | 2.5 | 2.5 | 3.25 | 2.25 | 2.75 |
| Thin Film Set (hr.) | 8.5 | 7.25 | 7.25 | 8 | 10.25 | 8.75 | 7 | 8 |
| Pendulum Hardness (Rocks, 1 week cure) | 84 | 87 | 96 | 111 | 77 | 62 | 82 | 87 |
| % Rust (ASTM D610) | 0.5 | 0.1 | 0.5 | 5 | 0.5 | 1.0 | 5 | 30 |
| Blistering (ASTM D714) | 10 | 10 | 10 | 10 | 10 | 10 | 10 | 10 |
| Pot Life (hr.) | 4.5 | 2.5 | 4.0 | 3.5 | 4.0 | 1.75 | 4.5 | 1.0 |
| Cause of End of Pot Life | PS | GL | GL | GL | GL | V | GL | PS |
| Reverse Impact (in-lb) | 8 | <4 | 4 | <4 | 12 | <4 | 32 | |
| Forward Impact (in-lb) | 40 | 24 | 56 | 16 | 44 | 28 | 96 | |
| Initial 60° Gloss | 108 | 107 | 120 | 120 | 108 | 109 | 121 | 123 |
| First Stage Eq Epoxide: Eq N—H | 1.68 | 1.68 | 1.68 | 1.68 | 1.68 | 1.68 | 1.68 | 2.22 |
| Second Stage Eq N—H:Eq Epoxide | 32.1* | 32.1* | 32.1* | 32.1* | 32.1 | 32.1 | 32.1 | 16.2 |

| Example | 17 | 18 | 19 | 20 | 21 | 22 | 23 |
|---|---|---|---|---|---|---|---|
| Dry-to-touch (hr.) | 3 | 2.5 | 1.5 | 2.75 | 4.25 | 3.75 | 4.5 |
| Thin Film Set (hr.) | 7.5 | 6.25 | | 7.75 | 8.5 | 9 | 7.75 |
| Pendulum Hardness (Rocks, 1 week cure) | 72 | 85 | 118 | 86 | 69 | 75 | 88 |
| % Rust (ASTM D610) | 5 | 15 | 10 | 10 | 30 | | |
| Blistering (ASTM D714) | 10 | 10 | 10 | 10 | 10 | 10 | 10 |
| Pot Life (hr.) | <0.5 | 0.5 | 0.75 | 0.5 | 4.5 | 4.5 | 4.5 |
| Cause of End of Pot Life | PS | PS | V, GL | PS | PS | PS | PS |
| Reverse Impact (in-lb) | | | 8 | | | 64 | 52 |
| Forward Impact (in-lb) | | | 16 | | | >160 | 116 |
| Initial 60° Gloss | 119 | 116 | 120 | 123 | 125 | 116 | 119 |
| First Stage Eq Epoxide: Eq N—H | 2.78 | 3.54 | 1.68 | 3.33 | 1.67 | 1.68 | 1.68 |
| Second Stage Eq N—H:Eq Epoxide | 10.1 | 6.01 | 32.1 | 18.5 | 15.6 | 32.1** | 32.1*** |

*If all of the MBPCAA incorporated in Ex. 8 were present in the second stage reaction, the Eq N—H:Eq Epoxide ratio would be 55.9:1.
**If all of the MBPCAA incorporated in Ex. 1 were present in the second stage reaction, the Eq N—H:Eq Epoxide ratio would be 60.7:1.
***If all of the MBPCAA incorporated in Ex. 1 were present in the second stage reaction, the Eq N—H:Eq Epoxide ratio would be 59.9:1.
PS -- Phase Separation
GL -- Gloss Loss
V -- Viscosity Increase Examples 9 through 12 indicate that an excellent balance of properties is obtainable with the hardener of Example 8. The properties obtained are formulation dependent. The best combination of humidity resistance and pot life is Example 9, although if modest improvement in dry time is desired, Example 11 may be preferred. As the level of Jeffamine M1000 amine in the hardener is raised from 20 (Ex 9) to 28.4% (Ex 15) to 40% (Ex 21), the humidity resistance decreases, the amount of water required for reduction increases, and the volume solids decreases. Examples 15 to 18 show that as the ratio of epoxide groups to N—H groups in the second reaction of the hardener is reduced, the water required for viscosity reduction generally increases, along with a decrease in volume solids. Pot life is greatly reduced, and there is a general increase in rust after humidity testing. It should be noted in Table 1 and Example 1 that the viscosity of the hardeners also increases rather dramatically, which may be the cause of some of the changes in the coating performances. Example 19 shows that when the Jeffamine M1000 amine level was reduced to 15%, the pot life was quite poor, and humidity resistance decreased. Example 20 shows that substitution of Jeffamine M2070 amine for M1000 amine reduces pot life and humidity resistance, although whether that is due to the increase in molecular weight or to the increase in propylene oxide in the poly(alkylene oxide) chain cannot be ascertained from available data.

In Examples 22 and 23, the hardener is modified with Jeffamine D400 amine and additional MBPCAA so that the total Jeffamine content is approximately the same as in Example 1. The addition of the D400 markedly improves impact resistance, although at the higher level (Ex 22), the solvent resistance (as measured with MEK rubs) was decreased relative to Examples 23 and 9.

Comparative Examples 24–26.

The formulations of Table 5 were prepared and tested according to the protocol of Examples 9–23. Anquamine 360 curing agent is a water-borne amidoamine commercially available from Air Products and Chemicals, Inc. with a % NV of 50 and an AHEW of 280. Anquamine 401 curing agent is a commercially available water-borne polyamine adduct curing agent from Air Products and Chemicals, Inc., with a % NV of 70 and AHEW of 200. EPI-REZ Resin 5522-WY-55 is a solid epoxy dispersion with an equivalent weight of 625 based on solids and a % NV of 55 and is commercially available from the Shell Chemical Co. EPI-CURE Curing Agent 8290-Y-60 is a water-borne polyamine adduct curing agent commercially available from the Shell Chemical Co. with a % NV of 60 and an equivalent weight of 163. The EPI-CURE 8290. and EPI-RF7 5522 were employed at a 15:85 weight ratio, which is recommended by the manufacturer to improve water and corrosion resistance and increase pot life relative to the stoichiometric ratio. Performance data is collected in Table 6.

TABLE 5

| Comparative Example | 24 | 25 | 26 |
|---|---|---|---|
| A Side | | | |
| Epoxy Resin, EEW = 190 | 53.87 | 63.02 | |
| Epi-Rez WJ-5522 | | | 138.15 |
| Benzyl Alcohol | 9.78 | 11.44 | |
| EP | 8.87 | 8.39 | 8.49 |
| Aromatic 100 | 1.28 | 1.5 | |
| B Side | | | |
| Anquamide 360 | 66.16 | | |
| Anquamine 401 | | 55.28 | |
| Epi-Cure 8290-Y-60 | | | 22.41 |
| DI Water | 49.62 | 50.22 | 30.44 |
| EP | 10.16 | 9.89 | |
| Dee-Fo PI4 Concentrate | 0.25 | 0.25 | 0.25 |
| DI Water to Reduce to 25 sec Viscosity | 45.16 | 43.13 | 39.41 |
| Calculated Constants | | | |
| % Plasticizer on Solids | 11.25 | 11.25 | 0 |
| Eq Epoxy:Eq N—H | 1.2 | 1.2 | 1.48 |
| VOC (lb/gal) | 1.20 | 1.20 | 2.18 |

TABLE 6

| Example | 24 | 23 | 25 |
|---|---|---|---|
| Dry-to-touch (hr.) | 3 | 3.25 | 1.75 |
| Thin Film Set (hr.) | 3 | 2.25 | 1.75 |
| Pendulum Hardness (Rocks, 1 week cure) | 92 | 115 | 54 |
| % Rust (ASTM D610) | 0.1 | 3 | 1 |
| Blistering (ASTM D714) | 6M | 8D | 10 |
| Pot Life (hr.) | 0.5 | <0.5 | 4.5 |
| Cause of End of Pot Life | V | V, GL | GL |
| Reverse Impact (in-lb) | <4 | 4 | 20 |
| Forward Impact (in-lb) | 20 | 52 | 112 |
| Initial 60° Gloss | 75 | 107 | 109 |

It is clear by comparison of Tables 4 and 6 that compositions of the present invention offer superior pot life and humidity resistance compared to other curing agents employed as emulsifiers for liquid epoxy resin. Compared to the solid resin dispersion and curing agent composition, the present invention offers better humidity resistance and comparable pot life along with much lower VOC and higher application solids.

Example 27.

An 'A' side was prepared by combining 144.42 g of EPI-REZ Resin 5522-WY-55 and 9.10 g of benzyl alcohol, and a "B" side from 13.26 g of the hardener of example 8, 15.89 g of EP, and 17.33 g of deionized water. The sides were then combined using the general procedure of examples 9–23. After a half hour induction time, the formulation was let down to a viscosity of 27" with 50.3 g of deionized water. After more than 7 hours, the viscosity was 24.0", and the 60° gloss was 123.5, compared to an initial gloss of 120.6. The films had a dry-to-touch time of about 1.5 hr. These results indicate that hardeners of this invention when combined with a solid epoxy dispersion give coatings with a very long pot life and high gloss, and demonstrate their utility with solid epoxy resin dispersions.

STATEMENT OF INDUSTRIAL APPLICATION

The present invention provides water dispersible curing agents for liquid and solid epoxy resin coating compositions.

I claim:

1. A coating composition comprising in an aqueous medium a polyepoxide resin and an epoxy hardener composition in an equivalents ratio of epoxy groups to amine hydrogens of about 0.5:1 to 2:1, the epoxy hardener composition comprising the reaction product of (A) a poly(alkylene oxide) mono- or diamine having a number average molecular weight (Mn) of 500 to 3000 and (B) a polyepoxide in a ratio of epoxide groups to active amine hydrogen atoms of about 1.1:1 to 6:1 to yield an intermediate (C) which is reacted with (D) a polyamine in a ratio of active amine hydrogen atoms to epoxide groups of >25:1, the amount of the poly(alkylene oxide) monoamine or diamine used to produce intermediate (C) being sufficient to provide a stable solution or emulsion of the epoxy hardener composition in an aqueous medium.

2. The coating composition of claim 1 in which the amount of the poly(alkylene oxide) monoamine or diamine used to produce intermediate (C) comprises 15 to 40 wt % of the epoxy hardener composition.

3. The coating composition of claim 1 in which the amount of the poly(alkylene oxide) monoamine or diamine used to produce intermediate (C) comprises 18 to 30 wt % of the epoxy hardener composition.

4. The coating composition of claim 1 in which the ratio of epoxide groups to active amine hydrogens in the production of intermediate (C) ranges from 1.3:1 to 6:1.

5. The coating composition of claim 1 in which the ratio of epoxide groups to active amine hydrogens in the production of intermediate (C) ranges from 1.5:1 to 2.5:1.

6. The coating composition of claim 1 in which intermediate (C) and polyamine (D) are reacted in a ratio of active amine hydrogen atoms to epoxide groups of >30:1.

7. The coating composition of claim 1 in which component (A) is a poly(alkylene oxide) monoamine.

8. The coating composition of claim 1 in which polyamine (D) is 4,4'-diaminodicyclohexyl methane.

9. The coating composition of claim 1 in which polyamine (D) is a mixture of methylene bridged poly(cyclohexyl-aromatic)amines.

10. A coating composition comprising in an aqueous medium a polyepoxide resin and an epoxy hardener composition in an equivalents ratio of epoxy groups to amine hydrogens of about 0.5:1 to 2:1, the epoxy hardener composition comprising the reaction product of (A) a poly(alkylene oxide) mono- or diamine having a number average molecular weight (Mn) of 500 to 3000 and (B) a polyepoxide in a ratio of epoxide groups to active amine hydrogen atoms of about 1.3:1 to 6:1 to yield an intermediate (C) which is reacted with (D) a polyamine in a ratio of active amine hydrogen atoms to epoxide groups of >30:1, the amount of the poly(alkylene oxide) monoamine or diamine used to produce intermediate (C) being 15 to 40 wt % of the epoxy hardener composition.

11. The coating composition of claim 10 in which the amount of the poly(alkylene oxide) monoamine or diamine used to produce intermediate (C) comprises 18 to 30 wt % of the epoxy hardener composition.

12. The coating composition of claim 10 in which the ratio of epoxide groups to active amine hydrogens in the production of intermediate (C) ranges from 1.5:1 to 2.5:1.

13. The coating composition of claim 10 in which component (A) is a poly(alkylene oxide) monoamine.

14. The coating composition of claim 10 in which polyamine (D) is 4,4'-diaminodicyclohexyl methane.

15. The coating composition of claim 10 in which polyamine (D) is a mixture of methylene bridged poly(cyclohexyl-aromatic)amines.

16. A coating composition comprising in an aqueous medium a polyepoxide resin and an epoxy hardener composition in an equivalents ratio of epoxy groups to amine hydrogens of about 0.5:1 to 2:1, the epoxy hardener composition comprising the reaction product of (A) a poly(alkylene oxide) monoamine having a number average molecular weight (Mn) of 800 to 1500 and (B) a polyepoxide in a ratio of epoxide groups to active amine hydrogen atoms of about 1.5:1 to 2.5:1 to yield an intermediate (C) which is reacted with (D) a polyamine in a ratio of active amine hydrogen atoms to epoxide groups of >30:1, the amount of the poly(alkylene oxide) monoamine used to produce intermediate (C) being 18 to 30 wt % of the epoxy hardener composition.

17. The coating composition of claim 16 in which polyamine (D) is 4,4'-diaminodicyclohexyl methane.

18. The coating composition of claim 16 in which polyamine (D) is a mixture of methylene bridged poly(cyclohexyl-aromatic)amines.

19. The coating composition of claim 17 in which the poly(alkylene oxide) monoamine is a monoamine terminated block copolymer of propylene oxide and ethylene oxide having an Mn of about 1200 based on its amine titer.

20. The coating composition of claim 19 in which the polyepoxide (B) is selected from the group consisting of the diglycidyl ether of bisphenol-A, the diglycidyl ether of bisphenol-F, and the diglycidyl either of an epoxy novolac derived from phenol and formaldehyde with an average functionality of about 2 to 4.

21. The coating composition of claim 17 in which the poly(alkylene oxide) monoamine is a monoamine terminated block copolymer of propylene oxide and ethylene oxide having an Mn of about 1200 based on its amine titer.

22. The coating composition of claim 19 in which the polyepoxide (B) is selected from the group consisting of the diglycidyl ether of bisphenol-A, the diglycidyl ether of bisphenol-F, and the diglycidyl either of an epoxy novolac derived from phenol and formaldehyde with an average functionality of about 2 to 4.

\* \* \* \* \*